(No Model.) 3 Sheets—Sheet 1.

D. F. OLIVER.
HAY RICKER.

No. 292,038. Patented Jan. 15, 1884.

Witnesses:
John T. Morrow
Villette Anderson.

D. F. Oliver
Inventor:
by Anderson Smith
his Attorneys (No Model.) 3 Sheets—Sheet 2.

D. F. OLIVER.
HAY RICKER.

No. 292,038. Patented Jan. 15, 1884.

Witnesses:
John R. Morrow
Villette Anderson.

D. F. Oliver,
Inventor,
by Anderson Smith
his Attorney (No Model.) 3 Sheets—Sheet 3.

D. F. OLIVER.
HAY RICKER.

No. 292,038. Patented Jan. 15, 1884.

WITNESSES
INVENTOR
D. F. Oliver,
ATTORNEYS

UNITED STATES PATENT OFFICE.

D. FRANKLIN OLIVER, OF HUNTSVILLE, MISSOURI.

HAY-RICKER.

SPECIFICATION forming part of Letters Patent No. 292,018, dated January 15, 1884.

Application filed November 17, 1883. (No model.)

*To all whom it may concern:*

Be it known that I, DOCTOR FRANKLIN OLIVER, a citizen of the United States, residing at Huntsville, in the county of Randolph and State of Missouri, have invented certain new and useful Improvements in Hay-Rickers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1:
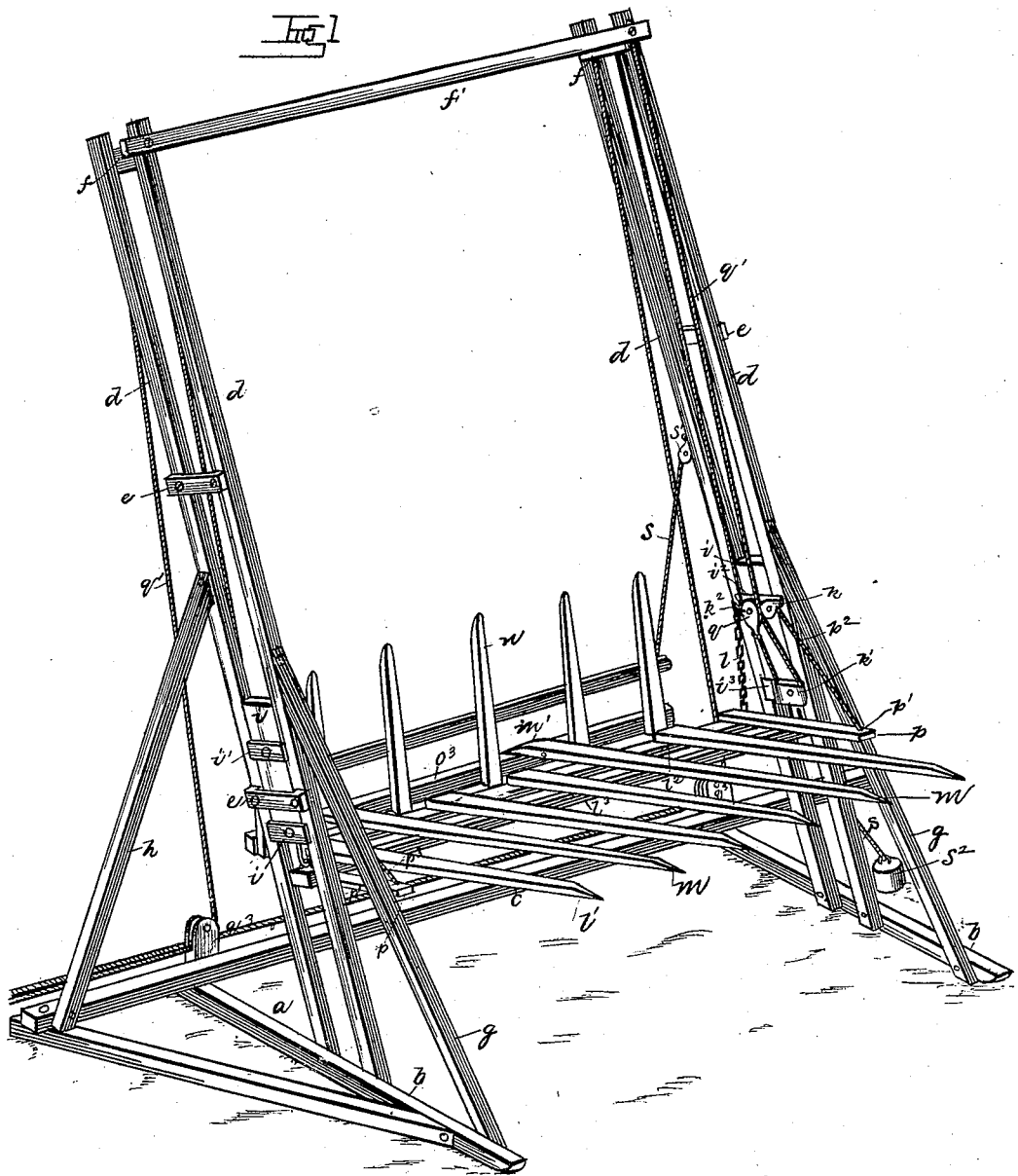
Figure 2:
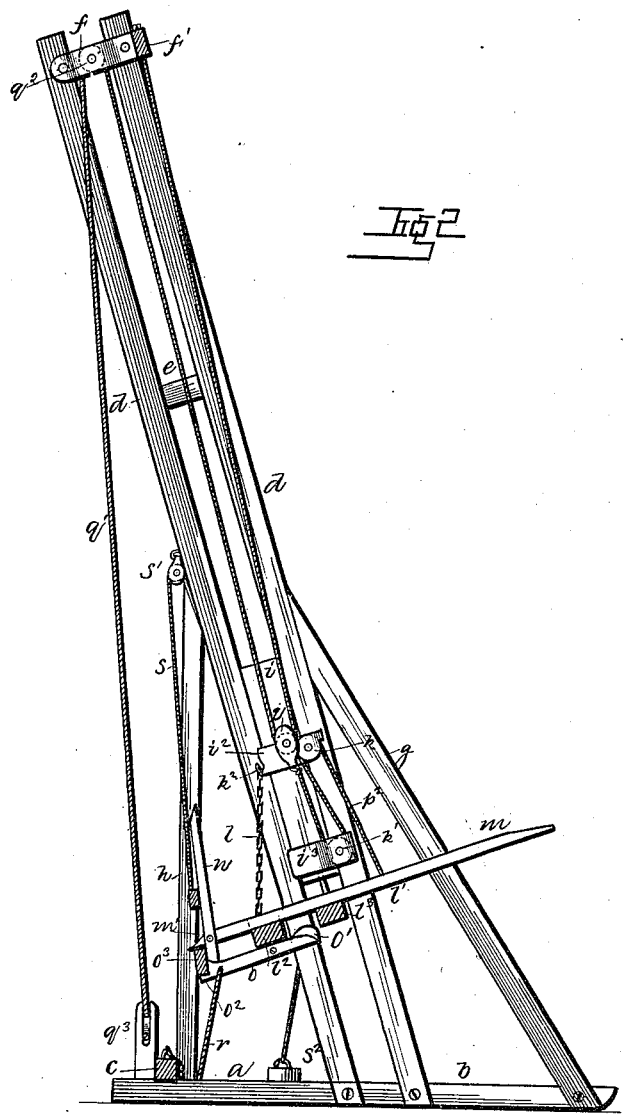
Figure 3:
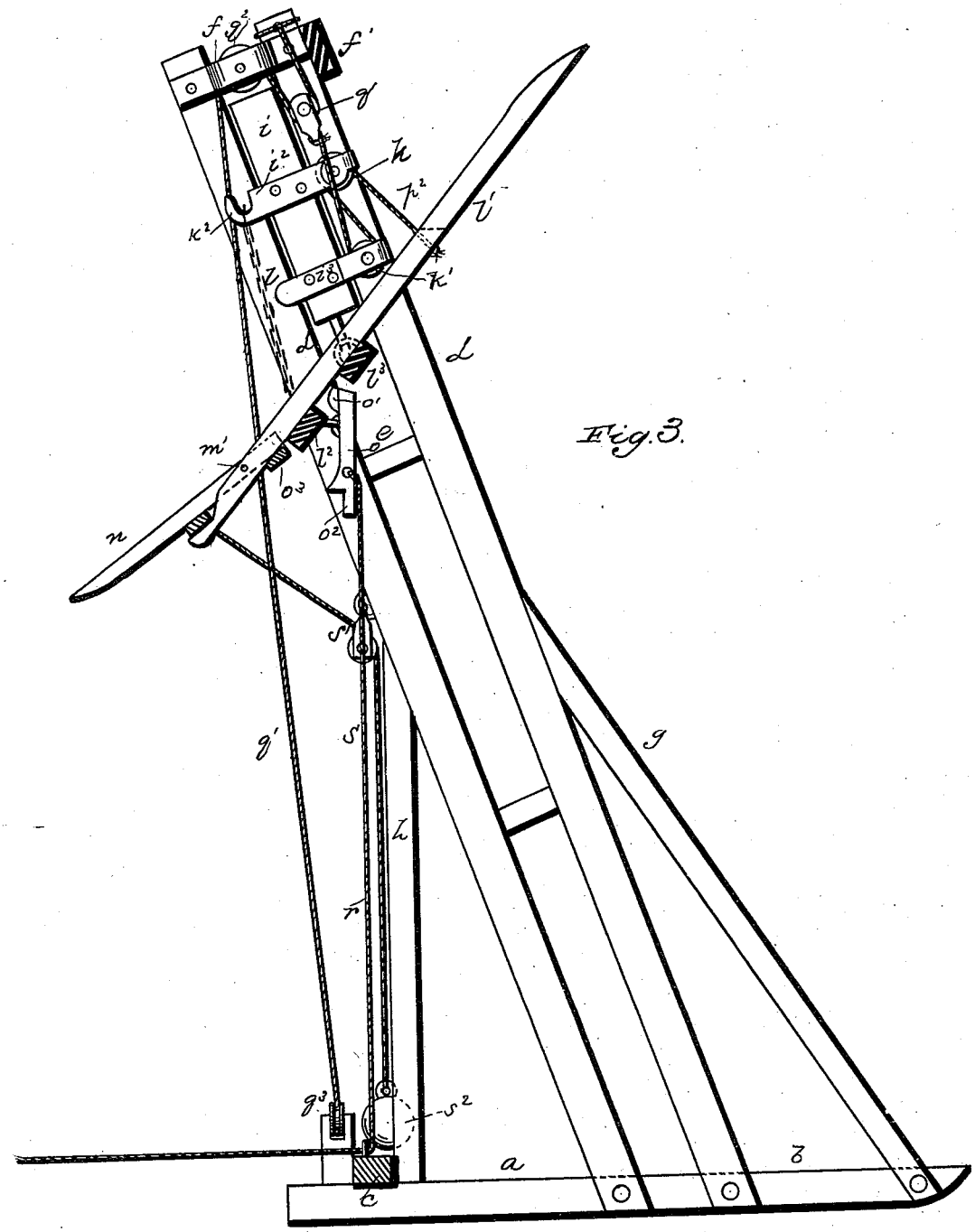

Figure 1 of the drawings is a representation of a perspective view of the machine. Fig. 2 is a side view of the same. Fig. 3 is a vertical sectional view of my device, showing the carriage in a dumping position.

This invention has relation to devices for stacking hay and the like; and it consists in the construction and novel arrangement of parts, as will be hereinafter fully described, and particularly pointed out in the claims appended.

Referring by letter to the accompanying drawings, $a$ designates the base of the frame, which consists of two runners, $b\ b$, connected near their rear ends by a cross-rail, $c$, which is about twenty feet in length. From these runners $b\ b$, and preferably secured to their inner faces at about the middle of their length, rise four parallel rearwardly-inclined uprights, $d\ d\ d\ d$. These uprights are about twenty feet long, and are connected in pairs by the runners $b\ b$ and recessed cleats or cross-strips $e\ e$ at suitable intervals between the runners and their upper ends, which latter are connected by pulley-boxes $f\ f$. A girder, $f'$, connects the pairs of uprights near the top at their front edges, and inclined braces $g\ g$ and $h\ h$, respectively ten and twelve feet long, extend upwardly from the runners and brace the uprights from the front and at the ends, as shown.

Two carriage-heads, $i\ i$, about four feet in length, are provided with outer guide-plates, $i'\ i'$, and inner guide-plates, $i^2\ i^2$, which guide the carriage-heads in the spaces between the inclined uprights. The inner guide-plates, $i^2\ i^2$, are provided at their front ends with the pulleys $k\ k'$, and the upper inner guide-plates, $i^2$, are provided at their rear ends with hooks $k^2$ for the attachment of the stay-chains $l\ l$. The upper guide-plates, $i^2\ i^2$, are located about the middle of the carriage-heads $i\ i$, and the lower inner guide-plates, $i^3\ i^3$, are located at the lower ends thereof. The main portion $l'$ of the carriage is made in the form of a hay-rake, the tines being secured to two parallel bars, $l^2\ l^2$, the front bar, $l^2$, being hinged at its ends to the lower ends of the carriage-heads $i\ i$, and the ends of the rear bar, $l^2$, being connected to the lower ends of stay-chains $l\ l$. Two or three of the tines $m\ m$ extend for a short distance to the rear of the rear bar, $l^2$, and have beveled shoulders $m'$. To these extended tines of the main carrier $l'$ are pivoted two or three of the tines of an auxiliary carriage, $n$, of rake form, the points of the tines of the carriage $n$ extending away from the rear of the main carriage $l'$. The carriage $n$ also has two parallel bars, to which the tines are secured.

To the under face of the rear bar, $l^2$, of the carriage portion $l'$, at its middle, is secured a pivoted weighted latch, $o$, having the weight $o'$ at its upper end and a shoulder, $o^2$, at its lower end, which shoulder $o^2$, when the latch $o$ and the auxiliary carriage $n$ are in their normal positions, will engage the lower or main parallel bar, $o^3$, of the carriage $n$ and hold the tines of the carriage $n$ nearly at right angles to the tines of the carriage $l'$.

The tilting-bars $p\ p$ of the carriage $l'$ are made shorter than the tines, and are provided at their front ends with holes $p'$, through which the end of an inch-rope, $p^2$, is passed downwardly and knotted, to prevent it from being withdrawn. The ropes $p^2\ p^2$ pass over the pulleys $k\ k$ on the upper inner guide-plates, $i^2\ i^2$, and down around the front edge of the lower pulleys, $k'\ k'$, on the lower inner guide-plates, $i^3\ i^3$, and thence up to the block of the loose pulleys $q\ q$, to which the other ends of the ropes $p^2\ p^2$ are secured.

The ropes $q'\ q'$ for raising and lowering the carriage are secured at the tops of the uprights and pass down around the loose pulleys $q\ q$, thence up over the fixed top pulleys, $q^2\ q^2$, and thence down under the stationary pulleys $q^3 q^3$, secured to the rear face of the long cross-rail $c$, which connects the runners $b\ b$, and away to the single-tree.

The pivoted weighted latch $o$ is provided with a rope, $r$, which is secured to the cross-rail $c$, so that it will trip the latch $o$ when the slack is taken out of the rope $r$, which latter may be arranged to trip the latch at any desired point to which the carriage has been elevated.

In its normal position the main carriage $l'$ is close to the ground and nearly horizontal, while the auxiliary carriage $n$ is engaged by the latch $o$, and is nearly vertical. The hay is loaded upon the main carriage $l'$ while it is in this position, and the power applied to elevate the loaded carriage. At the start the stay-chains $l\ l$ and the rope $r$ are slack, and as the ropes $q'\ q'$ commence to elevate the loose pulleys, they draw upon the ropes $p^2\ p^2$ and raise the front end of the carriage $l'$ until the slack is taken out of the stay-chains $l\ l$, when the entire carriage will ascend. The hay having been thrown back against the carriage $n$, by tilting the carriage $l'$ toward the rear will force the carriage $n$ outward in line with carriage $l'$ when the latch $o$ has been tripped, and the hay will be discharged, the height of the discharge being regulated by the amount of slack to be taken out of the rope $r$. For setting the carriage $n$ in its descent, a rope, $s$, is secured to the upper parallel bar of the same at one end and run over a pulley, $s'$, secured to one of the inclined uprights, and provided with a weight, $s^2$, at its lower end. The object of arranging the pulleys on the carriage-heads, as shown and described, is to raise the carriage clear to the top before tripping. The loose pulley, when the carriage is tilted, is only at the upper inner guide-plate. Consequently the carriage can be raised until the upper guide-plate strikes the fixed pulley at the top of the uprights. Furthermore, by this arrangement, even if the opposite ends of the carriage are not raised evenly, it will not bind in the ways. The outer guide-plates of the carriage-heads pass up and down through the recessed cleats connecting the inclined uprights.

The tilting-bars $p\ p$ extend in the rear of the main frame about twelve inches, and the stay-chains are connected to these extended ends.

To the inner faces of the tilting-bars boards $x\ x$ are bolted and suitably braced to prevent the hay from hanging to the tilting-bars. These boards $x\ x$ are about twelve inches wide and of the same length as the tilting-bars.

Having thus fully described my invention, what I claim as new, and desire to secure by Letters Patent, is—

1. In a hay-stacker, the combination, with the main carriage and frame and mechanism for tilting, raising, and lowering it in said frame, of a hinged folding auxiliary carriage connected thereto, and mechanism for holding and tripping it, substantially as specified.

2. In a hay-stacker, the combination, with the frame having rearwardly-inclined parallel uprights secured together in pairs, and having ways or spaces between them, of the carriage-heads, inner and outer guide-plates therefor, upper and lower pulleys mounted upon the inner plates, the stay-chains and tilting-ropes connecting the front and rear of the main carriage to the guide-plates, their pulleys, and the loose pulley-block, the folding carriage, and mechanism for operating them, substantially as specified.

3. In a hay-stacker, the combination, with the main carriage, its heads, operating pulleys, ropes, and stay-chains, of the folding or auxiliary carriage, the pivoted weighted latch, and ropes for tripping and setting the auxiliary carriage, substantially as specified.

4. In a hay-stacker, the combination, with inclined ways, carriage-heads working therein, and a tilting and folding carriage hinged to the lower ends of the carriage-heads, of mechanism for tilting, elevating, tripping, and lowering the same, substantially as specified.

5. In a hay-stacker, the combination, with the supporting-frame and the tilting and folding carriage, of the carriage-heads connected at their lower ends to said carriage, guide-plates on both sides thereof, upper and lower fixed pulleys, the loose pulley-block, ropes passing from the tilting-bars of the main carriage to the loose pulley-block, the stay-chains connected to the inner upper guide-plates, and to the rear ends of the main carriage, and mechanism for operating them, as set forth.

In testimony whereof I affix my signature in presence of two witnesses.

D. FRANKLIN OLIVER.

Witnesses:
  W. G. LEA,
  W. L. OLIVER.